United States Patent [19]

Morioka

[11] 4,216,045
[45] Aug. 5, 1980

[54] PROCESS FOR PREPARATION OF ELECTRODE FOR ALKALINE BATTERY

[75] Inventor: Yuji Morioka, Sumoto, Japan

[73] Assignee: Sanyo Electric Co., Ltd., Moriguchi, Japan

[21] Appl. No.: 906,340

[22] Filed: May 16, 1978

[30] Foreign Application Priority Data

May 18, 1977 [JP] Japan ................... 52-58064

[51] Int. Cl.$^2$ .................... C04B 35/00; B29C 19/00
[52] U.S. Cl. .................... 156/242; 204/291;
   252/182.1; 260/29.6 F; 264/104; 264/294;
   428/422; 429/212; 429/217; 429/222; 521/54;
   525/57; 525/187
[58] Field of Search .............. 260/29.6 F, 37 M, 900;
   428/422; 204/291; 264/104, 294, 127; 156/62.2,
   242, 306; 429/212, 222, 217; 252/182.1

[56] References Cited

U.S. PATENT DOCUMENTS

| | | | |
|---|---|---|---|
| 2,881,142 | 4/1959 | Eldridge | 260/29.6 F |
| 3,184,339 | 5/1965 | Ellis | 264/104 |
| 3,271,195 | 9/1966 | Berchielli et al. | 264/104 |
| 3,682,859 | 8/1972 | Taylor et al. | 260/900 |
| 3,736,184 | 5/1973 | Dey et al. | 252/182.1 |
| 3,898,099 | 8/1975 | Baker et al. | 252/182.1 |
| 3,980,612 | 9/1976 | Gangal | 260/29.6 F |
| 4,110,519 | 8/1978 | Nilsson | 429/217 |

*Primary Examiner*—William A. Powell
*Assistant Examiner*—J. J. Gallagher
*Attorney, Agent, or Firm*—Armstrong, Nikaido, Marmelstein & Kubovcik

[57] ABSTRACT

A novel process is provided for producing an improved electrode for an alkaline battery comprising the steps of adding an unsintered fluorocarbon resin powder to an active material powder and intimately mixing them together, applying a shear force to said mixture to thereby form agglomerates capable of retaining said active material powder in a network structure resulting from a fiber-formation of said fluorocarbon resin powder, adding an aqueous solution of a paste to said agglomerates, kneading them to mutually bind said agglomerates and thus forming a rubbery mass converting said rubbery mass into a sheet and attaching the sheet thus formed onto an electrically conductive core. The process provides an electrode having excellent reactivity and results in improved production efficiency.

10 Claims, No Drawings

PROCESS FOR PREPARATION OF ELECTRODE FOR ALKALINE BATTERY

BACKGROUND OF THE INVENTION

This invention relates to a process for producing an electrode of an alkaline battery and is specifically directed to a process for producing an electrode having high energy density, good mechanical strength and excellent reactivity of the active material by the use of an unsintered fluorocarbon resin as a binder.

In an enclosed type Ni-Cd battery, for example, it is an essential commercial requirement that the cadmium electrode has a charge-discharge life of at least 1,000 cycles, an energy density of at least about 500 mAH/cc and extremely good reactivity with an oxygen gas for the purpose of gas absorption inside the battery.

As an electrode satisfying these requirements, a sintered type electrode is generally known. The electrode consists of a porous substrate obtained by sintering a nickel powder and then impregnating the substrate with an active material.

In the sintered type electrode of the above-described type, however, the nickel powder forming the porous substrate is expensive. In addition, the porous substrate does not with certainty participate in the reaction from the standpoint of battery capacity so that the energy density obtainable is at the maximum about 600 mAH/cc. Moreover, it is a time-consuming and troublesome operation to form the porous substrate and to have the active material impregnated and supported inside pores of the substrate. For these reasons, the resulting electrode becomes necessarily expensive.

Apart from the abovementioned sintered type electrode, a paste type electrode also is known in the art.

The production process of this paste type electrode generally comprises kneading an active material powder into a paste form together with an aqueous solution of a paste, dissolving therein a natural or synthetic polymer paste material such as polyvinyl alcohol, methyl cellulose, carboxymethyl cellulose, polyethylene oxide and the like, coating the resulting paste onto an electrically conductive core body and drying the core to form the electrode.

In comparison with the sintered type electrode, the paste type electrode is more advantageous in that the number of production steps is less and since the major part of the electrode is formed by the active material which participates in the battery reaction, the obtainable energy density is by far higher, that is to say, up to about 700 mAH/cc. However, the paste type electrode is not free from drawbacks. Since the polymer paste used as the binder is swellable in water which is one of principal components of an electrolyte, the electrode does not have sufficient mechanical strength. Also, the polymer paste is oxidized inside the battery to form a carbonic acid ion in such an amount as to exert adverse influence on the battery reaction. Furthermore, since the binding mechanism of the polymer paste relies on a film-forming action, the active material is partially covered by the film, thereby lowering its reactivity.

As a method of improving these drawbacks, U.S. Pat. No. 3,630,781 discloses a novel production method of an electrode similar to the paste type electrode.

This method is characterized by the use of an unsintered fluorocarbon resin, e.g., tetrafluoroethylene resin (hereinafter referred to as PTFE), hexafluoropropylene resin, chlorotrifluorroethylen resin, vinylidene fluoride resin, and copolymer variations thereof, as a binder. More specifically, the method comprises dispersing and homogeneously mixing an active material powder in a water-soluble dispersion of the PTFE resin obtained by emulsion polymerization, irreversibly breaking said dispersion under conditions such that the PTFE resin is not sintered, applying a shear force so as to cause fiber-formation in the PTFE resin and thus form a rubbery mass having malleability in such a state where the active material and the residual water are retained inside the resulting network structure of the PTFE resin, forming a sheet from the rubbery mass by an ordinary calender method and attaching the sheet to an electrically conductive core to thereby obtain the contemplated electrode.

It is known that when a shear force is applied, the chain-like molecules of the abovementioned unsintered PTFE resin obtained by emulsion polymerization cause fiber-formation and entangle with one another to form a network structure and thus exhibit a certain kind of binding effect.

The PTFE resin has extremely good oxidation resistance and chemical resistance and does not form a carbonic acid ion which occurs when the aforementioned polymer paste is used. Since the binding action of the PTFE resin does not rely on the film-forming action as in the case of the polymer paste, the active material is maintained in good contact with the electrolyte as well as with the gas. In order to obtain the same mechanical strength for a given electrode, the weight required for the resin is about ½ and the volume is about ¼ in comparison with the polymer paste (the density of the PTFE resin being about two times the polymer paste).

As mentioned above, the method of U.S. Pat. No. 3,630,781 is definitely advantageous when compared with the conventional paste type electrode.

In the method of U.S. Pat. No. 3,630,781, however, the active material powder is mixed with the aqueous dispersion of the PTFE resin and the dispersion is then irreversibly broken. Accordingly, in the sense of "mixing", the homogeneous state is established between the active material and the fluorocarbon resin, but from the viewpoint of the battery performance and mechanical strength, the excessive homogenity is not only meaningless but also involves a possible problem that a phenomenon similar to the film-forming action of the polymer paste can occur due to the water-repellency of the fluorocarbon resin.

In addition, the dispersion contains residual surfactant used for the purpose of keeping the water-repellent PTFE resin in the emulsified and dispersed state in water and residual catalyst used for the emulsion polymerization. In order to eliminate the adverse influence of these agents on battery performance, an additional step of removing these additives is necessary after formation of the electrode.

During the abovementioned production steps, it is necessary at the step of forming the rubbery mass to partially reduce the water content of the dispersion and set the residual water content to a predetermined level in order to apply the shear force. Since the removal of the water is carried out by such means as evaporation by heating, control is not easy. During the step of applying the shear force after removal of water, the energy loss of the shear force is great due to lubricative effect of the water, and it is difficult to form the network structure of the PTFE resin having a predetermined strength with a high level of accuracy.

Because of the viscosity of the fibers of the PTFE resin, the surface of the electrode thus finished is adherent. Hence, the active material is sometimes peeled off upon contact with other components, such as the separator during the assembly of the battery. For this reason, the adherent electrode is extremely difficult to handle from the aspect of assembly. It is of further significance that when an active material having high reactivity with water such as cadmium oxide is used as the starting material, cadmium oxide readily reacts with the water during the mixing step with the aqueous dispersion and such reaction affects adversely the battery performance.

In other words, as illustrated by the following reaction scheme;

$$CdO + H_2O \rightarrow Cd(OH)_2$$

cadmium oxide readily reacts with the water whereby cadmium oxide having a large density (8.15 g/cm$^3$) is converted to cadmium hydroxide (density=4.79 g/cm$^3$). This increase in the volume takes place during the production of the electrode and consequently, the packed density per unit volume of the active material is reduce, thereby resulting in a decrease in the energy density. For this reason, the upper limit of the energy density is at the maximum about 750 mAH/cc in accordance with this method.

On the other hand, in addition to the aforementioned aqueous dispersion of the PTFE resin, an unsintered PTFE resin of such a type is also commercially available. In such a resin, detrimental components adversely affecting the battery performance such as the surfactant, the catalyst and the like are perfectly removed by aggregating the resin after the emulsion polymerization.

U.S. Pat. No. 3,898,099 proposes a production method of an electrode using an unsintered PTFE resin powder of the abovedescribed type.

The method of U.S. Pat. No. 3,898,099 is different from that of the abovementioned U.S. Pat. No. 3,630,781 in that it uses a PTFE resin powder and non-aqueous lubricant in place of the aqueous dispersion of the PTFE resin.

Since this method uses non-aqueous lubricant, it is possible to prevent cadmium oxide from being converted to cadmium hydroxide. Another advantage of this method is that the PTFE powder does not contain the additives affecting adversely the battery performance such as the surfactant, the catalyst, etc., thus the method does not require the additional step of removing these additives.

According to the method of U.S. Pat. No. 3,898,099, however, the non-aqueous lubricant is added in an excessive amount in order to obtain a homogeneous mixture of the active material and the PTFE resin powder. In removing the lubricant, therefore, it is difficult to control the residual liquid amount to a predetermined level. It is further necessary in this method to perfectly remove the lubricant after the formation of the electrode and for that purpose, drying is carried out. However, this drying treatment must be carried out at a temperature below the sintering temperature of the PTFE resin. Hence, the lubricant to be used is necessarily restricted to volatile lubricants such as mineral spirits, for example. This inevitably results in harm of organic solvents and inevitably requires use of a large-sized production apparatus.

SUMMARY OF THE INVENTION

It is therefore a primary object of the present invention to provide a process for producing an improved electrode for an alkaline battery which uses an unsintered fluorocarbon resin powder as a binder.

According to the process of the present invention, it is possible to obtain an electrode having excellent reactivity and to improve production efficiency.

The present invention provides a process for producing an electrode for an alkaline battery which comprises adding an unsintered fluorocarbon resin powder to a battery electrode forming active material powder and mixing them together, applying a shear force to this powder mixture to cause fiber formation within the fluorocarbon resin powder and to form agglomerates capable of retaining the active material powder inside the network structure of the fluorocarbon resin, adding a predetermined amount of an aqueous paste solution to the agglomerates, kneading the resulting mixture to form a rubbery mass having high malleability, forming a sheet from the rubbery mass, and attaching the resulting sheet onto an electrically conductive core body and drying the same.

The present invention further provides a process for producing a cadmium electrode for an alkaline battery wherein when the active material is cadmium oxide, and a condensation oxyacid salt is added to the aqueous paste solution.

In the present invention, the scope of the fluorocarbon resin is the same as described in U.S. Pat. No. 3,630,781.

The abovementioned PTFE resin powder is commercially available in the form of secondary particles of a particle size of about 400 microns consisting of primary particles of about 0.3 microns agglomerated with one another. On the other hand, the particle size of the active material powder such as cadmium oxide, for example, is about 1 micron. A small amount of the commercially available PTFE resin is dry-mixed macroscopically substantially uniformly with a substantially greater amount of the cadmium oxide powder using a mixing machine such as a conical blender or a V-blender. A shear force is then applied to this powder mixture. This is accomplished by the use of a pestle on the laboratory scale or a pulverizing mill on the industrial scale. In this process step by the application of sufficient shear force, the PTFE resin is gradually formed into a fibrous network structure, which collects the active material, promotes submicroscopic mixing, and forms flock-like agglomerates. Since the formation of the agglomerates is effected in the dry state, the energy for applying the shear force acts in an efficient manner and the network structure is formed with a reliably controlled strength. In this instance, the amount of the PTFE resin powder is suitably 0.5–2%, preferably 1%, on the basis of the amount of the active material. If the amount of the resin powder is not greater than 0.5%, sufficient strength can not be obtained. If the amount exceeds 2%, on the other hand, the range of the PTFE resin inside the electrode increases and the reactivity of the active material is lowered. Hence, the use of the excessive resin powder should be avoided.

Next, a predetermined amount of an aqueous paste solution is added to the abovementioned flock-like agglomerates and kneaded using a kneading machine, such as a kneader. During this kneading step, numerous and large and small flock-like agglomerates condense into one rubbery mass. Namely, the added aqueous paste solution enters the voids inside the agglomerates and functions to condense these agglomerates into one rubbery mass.

The abovementioned aqueous paste solution is obtained by dissolving a polymer paste in water. The viscosity of the resulting solution is sufficiently within the range of from 50 to 3,000 cps. Though a similar effect could be obtained by the use of an optional paste, preferred are polyvinyl alcohol, polyethylene oxide, hydroxypropyl cellulose and the like in view of the oxidation resistance of these materials and their viscosity inside the battery. The added amount of the paste may be only a trace (0.2–0.4 parts by weight per 100 parts by weight of the active material). In comparison with the conventional production method of the paste type electrode wherein the paste is used as a binder (2 part by weight of the paste per 100 parts by weight of the active material), therefore, the use of the paste in such an amount hardly affects the battery performance. The amount of water used as a solvent of the paste is preferably such that it accounts for 60% of the void capacity of the agglomerates. If it exceeds 80%, the water functions to unbind the network structure of the PTFE resin fiber. On the contrary, if the amount is less than 45%, it is difficult to form the rubbery mass.

It is another important feature of the present invention that when cadmium oxide is used as the active material, a condensation oxyacid salt is dissolved in the abovementioned aqueous paste solution.

As already described, during the production of a cadmium oxide electrode using cadmium oxide as the starting material, cadmium oxide readily reacts with water and is converted to cadmium hydroxide having a lower density. Consequently, it is difficult to obtain an electrode having a high energy density. In the present invention it has been found, however, that conversion of cadmium oxide to cadmium hydroxide can be prevented by adding a condensation oxyacid salt to the water and dissolving it therein. It is assumed that this effect arises from the function of the condensation oxyacid salt as a negative catalyst during the reaction between the water and cadmium oxide. Preferred examples of the condensation oxyacid salt include disodium hydrogenphosphate dodeca hydrate ($Na_2HPO_4 \cdot 12H_2O$), sodium pyrophosphate, sodium hexametaphosphate, sodium orthosilicate, disodium hydrogenarsenate and the like. The amount of added salt, for example, in the case of disodium hydrogenphosphate dodeca hydrate, is from 0.2 to 2.0% on the basis of the cadmium oxide active material to obtain sufficient effect. It is confirmed that such an amount of the salt hardly exerts any adverse influence on the battery performance after the electrode is assembled in the battery.

Since the liquid filling up the internal voids of the rubbery mass has a remarkably high viscosity in comparison with water or an organic solvent as mentioned already, the rubbery mass obtained in this manner can easily be shaped into a sheet by means such as an ordinary calender method. In other words, the liquid per se yet remains as a non-compressive fluid and causes deformation depending upon pressurizing. Nonetheless, since the liquor still maintains its viscosity, it does not easily escape from the network structure of the resin, thereby enabling to attain a uniform packed density. Unlike the aforementioned U.S. Pat. Nos. 3,630,781 and 3,898,099, the process of the invention adds the liquid in a predetermined amount so that control of the density, etc. becomes easy and workability becomes higher.

In the methods of the abovementioned prior art, all of mixing, removal of the solution and application of the shear force are carried out in the wet state. Consequently, loss of the raw materials due to their sticking to the container, etc. is inevitable in each of these steps. By contrast, in accordance with the process of the present invention, the PTFE resin and the active material are dry-mixed and the formation of the rubbery mass is attained by perfect integration of the raw materials without passing through the slurry state. Hence, there is no loss at all of the raw materials.

Additionally, the surface of the electrode after completion of drying in the present process is smooth without any tackiness due to the addition of the paste and hence, the electrode is easy to handle and provides another advantage with respect to the working efficiency.

DESCRIPTION OF THE PREFERRED EMBODIMENT

The present invention will be explained in further detail with reference to an embodiment thereof.

EXAMPLE

To 100 parts by weight of an active material consisting of a 9:1 mixture (weight ratio) of a cadmium oxide powder and a metallic cadmium powder is added 1 part by weight of a commercially available unsintered PTFE powder and the materials are mixed by a rotary dry mixer. Using a pulverizing mill, the mixture is subjected to a shear force so as to cause the PTFE resin to form a fibrous network and to form agglomerates of the active material powder and the PTFE resin powder. An aqueous paste solution, prepared separately by dissolving 0.2 parts by weight of polyethylene oxide and 1 part by weight of disodium hydrogenphosphate dodeca hydrate in 33.8 parts by weight of water and having a viscosity of about 400 cps., is added to the abovementioned agglomerates and kneaded inside a kneader to thereby form a rubbery mass. The resulting rubbery mass is then shaped into a 0.4 mm-thick sheet by an ordinary calender method and the sheet thus obtained is attached onto both surfaces of an electrically conductive core body consisting of a nickel-plated iron sheet and dried at 80° C. The thickness of the core body is then reduced by a press roller so that the packed density becomes 2.7 g/cc calculated as metallic cadmium. The core body is subsequently cut to a predetermined dimension to obtain a cadmium electrode.

Performance is compared between the cadmium electrode (A) obtained in accordance with the process of the present invention, the cadmium electrode (B) obtained by the method of U.S. Pat. No. 3,630,781 and the cadmium electrode (C) obtained in a customary manner using a polymer paste such as methyl cellulose as a binder. The results are illustrated in the following table.

| Electrode | A | B | C |
|---|---|---|---|
| Efficiency of active material (0.2c standard), % | 74.8 | 73.0 | 65.5 |
| Energy density (''), mAH/cc | 908 | 750 | 685 |
| *Equilibrium pressure (0.1c charging), kg/cm$^2$ | 0.7 | 1.3 | 4.8 |
| *Ratio of capacity after 100 | | | |

-continued

| Electrode | A | B | C |
|---|---|---|---|
| cycles to the initial capacity | 103 | 100 | 89 |
| High rate discharging performance (4c capacity/0.1c capacity) | 74.0 | 70.5 | 59.2 |

The test items marked with asterisks in the above table indicate the performance of an enclosed type alkaline battery using the electrode in combination with the ordinary sintered type nickel hydroxide electrode.

It can be appreciated from the table above that in comparison with the cadmium electrode (C) obtained by the ordinary production method, the electrodes (A) and (B) respectively obtained by the process of the present invention and the method of U.S. Pat. No. 3,630,781 exhibit drastic improvement in their performance.

In comparison with the cadmium electrode (B) of the U.S. Pat. No. 3,630,781, the cadmium electrode obtained by the present process exhibits further dramatic improvement.

This improvement may be attributed to the following point. According to the method of U.S. Pat. No. 3,630,781 as mentioned already, the active material powder is mixed in the aqueous dispersion of the fluorocarbon resin and the dispersion is then subjected to breaking so that the active material and the fluorocarbon resin are excessively homogenized. Due to the water repellency inherent in the fluorocarbon resin, therefore, there occurs a phenomenon similar to the film-forming phenomenon occurring when a polymer paste is used as a binder, whereby the contact of the active material with the electrolyte as well as with the gas becomes inferior to the process of the present invention, and the efficiency of the active material and the equilibrium pressure also become inferior. Meanwhile, in the process of the present invention, since the active material and the fluorocarbon resin are mixed in the powder form and subjected to shear force, there is not obtained an excessively homogeneous mixing. It is assumed that the difference in the mixing method gives the electrode of the present invention its better performance characteristics.

Whereas the cadmium oxide active material reacts with water and is easily converted to cadmium hydroxide of lesser packed density during the mixing step with the aqueous dispersion and the step of reducing the water content in the production method of U.S. Pat. No. 3,630,781, the condensation oxyacid salt is added in the process of the present invention to the aqueous paste solution to be added to the agglomerates for forming the rubbery mass so that it is possible to prevent conversion of cadmium oxide to cadmium hydroxide and to accomplish remarkable improvement in the energy density.

Due to the addition of the paste, the surface of the finished electrode is smooth without tackiness, thereby improving the operational efficiency of the subsequent assembly of the battery.

As described in the foregoing paragraph, the present invention provides a production process of an electrode for an alkaline battery, said electrode having high energy density and good mechanical strength, ensuring extremely high reactivity to the active material and improving the workability. Hence, the process of the present invention has extremely great industrial advantage.

What is claimed is:

1. A process for preparation of an electrode for alkaline battery comprising the steps of:
   (a) forming an intimate admixture consisting essentially of an unsintered fluorocarbon resin powder and a battery electrode forming active material powder;
   (b) applying a shear force to said mixture sufficient to cause the fluorocarbon resin to be formed into fibers and to form agglomerates capable of retaining said active material powder inside a network structure resulting from a fiberformation of said fluorocarbon resin powder;
   (c) adding an aqueous solution of natural or synthetic polymer paste to said agglomerates;
   (d) kneading the resulting mixture to mutually bind said agglomerates and thus form a rubbery mass;
   (e) converting said rubbery mass into a sheet; and
   (f) attaching the sheet so formed onto an electrically conductive core body.

2. The process for preparation of an electrode for an alkaline battery as defined in claim 1 wherein said fluorocarbon resin is polytetrafluoroethylene.

3. The process for preparation of an electrode for an alkaline battery as defined in claim 2 wherein the amount of said polytetrafluoroethylene is from 0.5 to 2.0% based on the weight of said active material powder.

4. The process for prepation of an electrode for an alkaline battery as defined in claim 1 wherein said natural or synthetic polymer paste is a member selected from the group consisting of polyvinyl alcohol, polyethylene oxide, methyl cellulose, hydroxypropyl cellulose and carboxymethyl cellulose and the amount thereof is from 0.2 to 0.4% based on the weight of said active material powder.

5. The process for preparation of an electrode for an alkaline battery as defined in claim 1 wherein said aqueous paste solution has a viscosity of 50 to 3,000 cps.

6. The process for preparation of an electrode for an alkaline battery as defined in claim 1 wherein said active material is cadmium oxide and an alkali metal condensation oxyacid salt is added to said aqueous paste solution.

7. The process for preparation of an electrode for an alkaline battery as defined in claim 6 wherein said condensation oxyacid salt is an alkali metal oxyacid salt of phosphorus, silicon or arsenic.

8. The process for preparation of an electrode for an alkaline battery as defined in claim 6 wherein the amount added of said condensation oxyacid salt is from 0.2 to 2.0% based on the weight of the cadmium oxide powder.

9. The process for preparation of an electrode for an alkaline battery as defined in claim 1 wherein said active material is CdO.

10. The process for preparation of an electrode for an alkaline battery as defined in claim 6 or 7 wherein said aqueous paste solution has a viscosity of 50 to 3000 cps.

* * * * *